Nov. 13, 1923. 1,474,202
D. B. MACDONALD
MACHINE FOR MAKING STIFFENERS, STIFFENING MATERIAL, INSOLES,
AND LIKE PARTS FOR BOOTS AND SHOES
Filed March 31, 1920   4 Sheets-Sheet 1

Inventor David Baird Macdonald
by Connolly Bros attys

Nov. 13, 1923.                                                1,474,202
D. B. MACDONALD
MACHINE FOR MAKING STIFFENERS, STIFFENING MATERIAL, INSOLES,
AND LIKE PARTS FOR BOOTS AND SHOES
Filed March 31, 1920      4 Sheets-Sheet 2
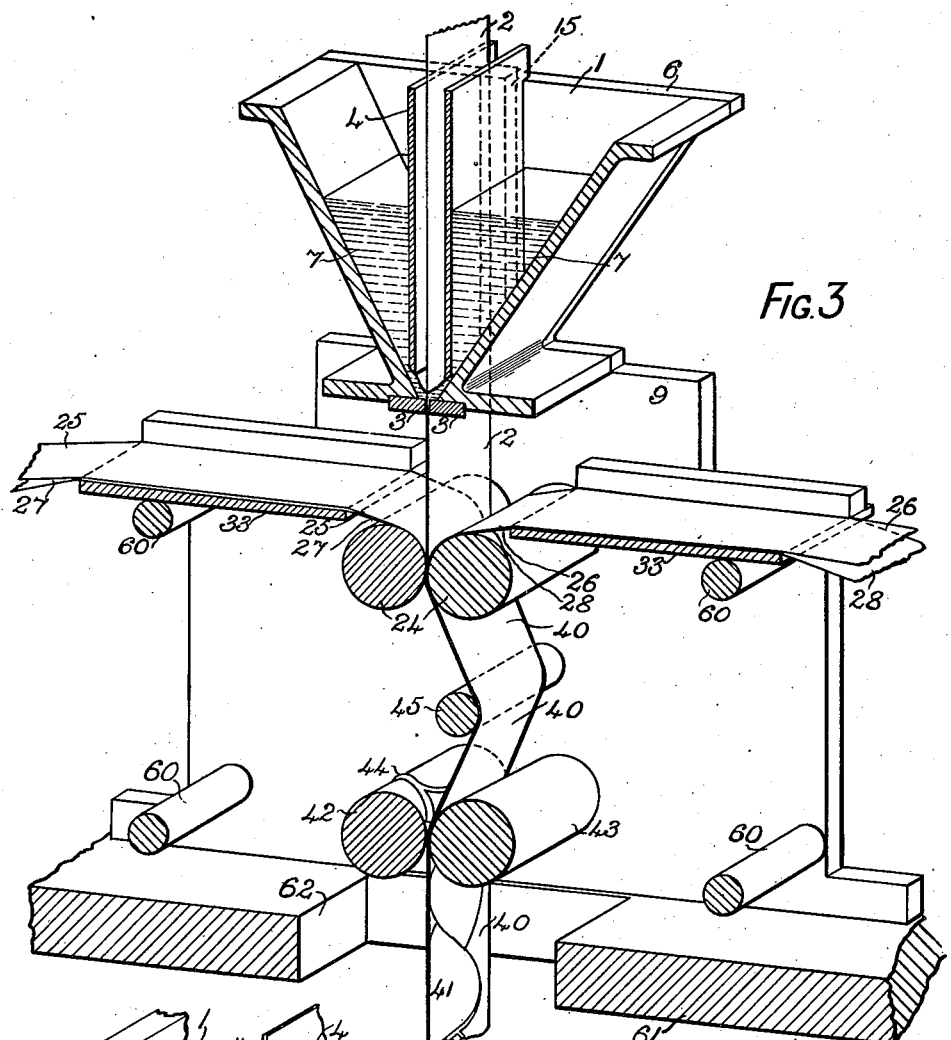
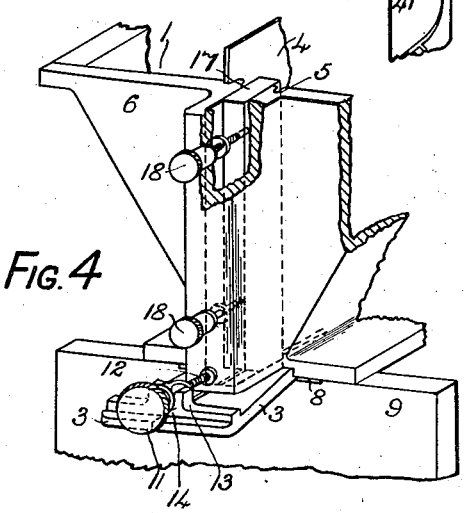
Inventor
David Baird Macdonald
by Connolly Bros
Atty Inventor
David Baird Macdonald
by Connolly Bros
attys.

Patented Nov. 13, 1923.

1,474,202

UNITED STATES PATENT OFFICE.

DAVID BAIRD MACDONALD, OF LEICESTER, ENGLAND.

MACHINE FOR MAKING STIFFENERS, STIFFENING MATERIAL, INSOLES, AND LIKE PARTS FOR BOOTS AND SHOES.

Application filed March 31, 1920. Serial No. 370,128.

*To all whom it may concern:*

Be it known that I, DAVID BAIRD MAC-DONALD, subject of the King of Great Britain, residing at Leicester, in the county of Leicester, England, have invented a new or Improved Machine for Making Stiffeners, Stiffening Material, Insoles, and like Parts for Boots and Shoes, of which the following is a specification, reference being had thereto in to the accompanying drawing.

This invention relates to the production of stiffeners, insoles and like parts for boots and shoes and comprehends a new or improved machine or apparatus for making such articles in a continuous manner as will be hereinafter described.

The main purpose of the invention is to construct a machine for producing stiffeners, stiffening material, insoles and like parts of the kind consisting of a plurality of layers of material combined with which is a gum or other stiffening agent. Stiffeners of this character are used for stiffening various parts of boot and shoe uppers, principally the toe, and the machine of the present invention is intended for use more especially in making the articles described in the specification of my United States Patent No. 1345944, dated July 6th, 1920, although it is to be understood that it is not necessarily to be limited to such use, as it may be employed for making other stiffeners and also soles of similar kind.

The invention consists of a machine wherein the material to form the carrier for the stiffening agent is passed in one or more continuous lengths through a trough or other receptacle containing the stiffening agent in bulk and in solution or moist condition, and one or more subsidiary layers in continuous length are subsequently brought into association with the said carrier layer or layers by means such as a pair of rollers, the combined lengths of material being thereafter automatically cut to produce the articles required.

In order that the invention may be clearly understood, reference will be made, in the following further description, to the accompanying drawings which show some practical examples of the manner in which the invention may be carried out.

In the drawings:—

Figure 3 is a vertical sectional perspective view of the same.

Figure 4 is a perspective view of a modification.

Figure 5 is a side view of the means for adjusting the scrapers.

Figure 1 is drawn to a smaller scale and Figures 8 and 9 are drawn to a larger scale than the other figures. Throughout the drawings like parts are designated by the same reference characters.

Figure 1:
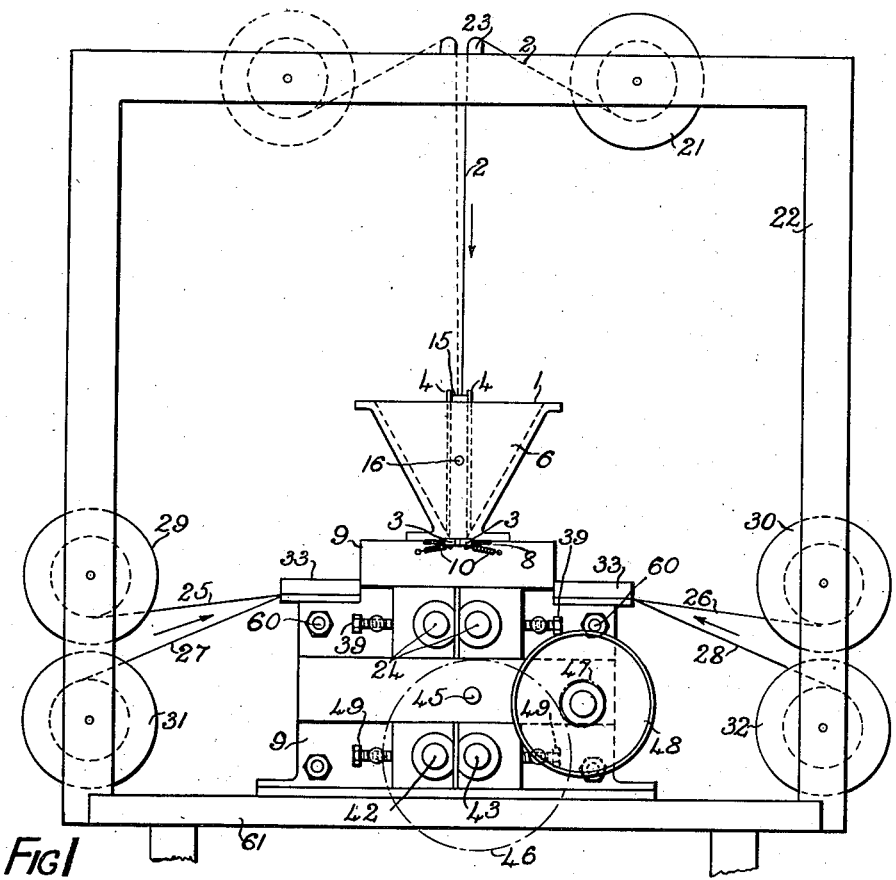
Figure 1 is a side elevation showing a general arrangement of a machine of convenient form.

The stiffening agent is contained in a trough 1 or tank (Figures 1, 2 and 3), preferably having inclined sides as shown so that the receptacle is narrow at the bottom where it is open. A length of material 2 in the form of a continuous strip is passed downwards through the trough and out through the open bottom. At each side of the open bottom an adjustable scraper 3 is fitted to remove the superfluous stiffening agent from the continuous strip 2 as it passes through the open bottom, and in order to regulate the flow of the stiffening agent to the strip material, the trough is equipped with two shutters or partitions 4 arranged to slide in grooves 5 formed in the ends 6 of the trough so as to be adjustable vertically to vary the space between their lower edges and the inclined sides. The constinuous strip 2 passes down between these shutters 4, the stiffening agent 7 as represented in Figure 3, flowing underneath the bottom edges of same on to each side of the strip before the latter passes through the open bottom. If the strip is to be coated on one side only, one of the shutters 4 is closed down to stop the flow of the agent at one side.

Figure 2:
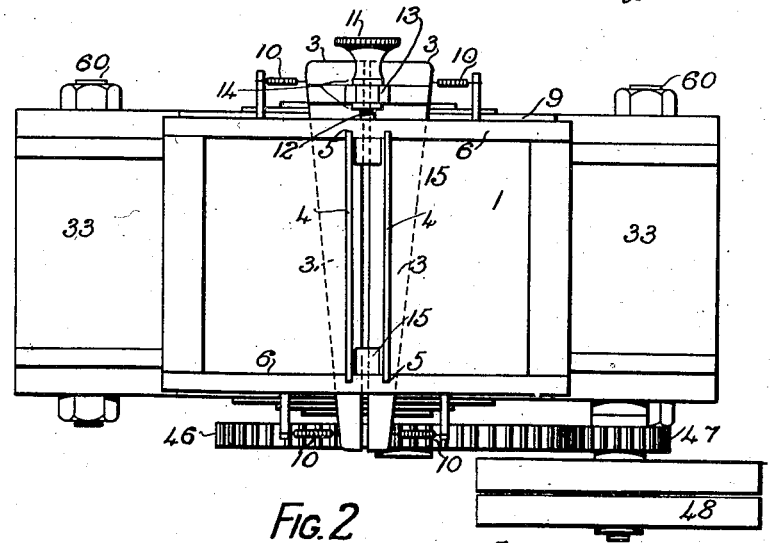
Figure 2 is a plan of the machine.
Figure 10:
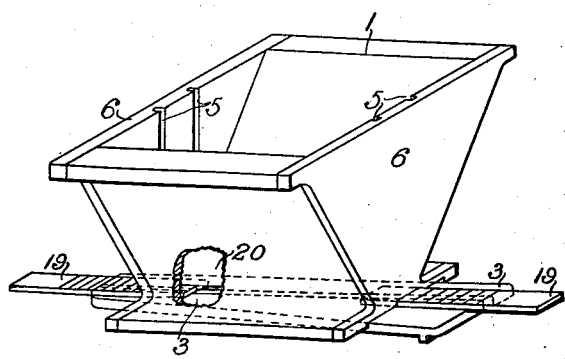
Figure 10 is a perspective view of the trough fitted with modified means for regulating the opening.

The scrapers 3 are conveniently in the form of plates having, as shown in Figures 2 and 10, parallel inner edges and converging outer edges. The two plates are located in a recess formed in the underside of the trough the recess having converging sides to suit the outer edges of the plates. At opposite ends the plates rest in the recessed upper edge 8 of the side frames 9 of the machine said plates being held closely up to the underside of the open bottom of the trough to close the same and prevent undue escape of the stiffening agent therefrom. The plates 3 are relatively adjustable so that the space between their inner edges may be varied to regulate the amount of stiffening agent allowed to remain on the strip 2 as it passes between the plates. To this end the pair of plates is movable lengthwise each plate being held against the angular side of the recess by springs 10 said side serving as a guide. Endwise movement of the plates 3 in one direction allows them to separate and widen the intervening space while opposite movement causes the plates to move towards each other and reduce the space. The endwise movement is imparted to the plates conveniently by a screw 11, Figures 1, 4 and 5, working on a fixed stud 12 a projection 13 on each plate being engaged between shoulders 14 on the screw.

At each end the trough 1 is provided with means for regulating the length of the feed space between the shutters 4 to suit strips of material i. e. the strip 2, of different widths and such means may also regulate the length of the opening constituted by the space between the plates 3. According to one arrangement bars 15 are attached in a removable manner to the inside of each end of the trough as shown in Figures 1, 2 and 3. The distance between these opposing bars 15 constitutes the feeding space for the width of the continuous strip 2 the said space being varied by substituting other similar bars of greater or less thickness. These bars fit down to the bottom and rest on the top of the plates 3 so that they also determine the effective length of the opening between the opposing plates 3. The removable bars may be fastened in position by screws 16 (Figure 1) or by other suitable means.

In a modified construction each end 6 of the trough may be fitted with a slide 17 (Figure 4) the projection of which into the trough between the shutters 4 is regulated by rotatable screws 18. These slides 17 replace the bars previously mentioned and also extend to the bottom of the trough so that when adjusted by their screws they will regulate the effective length of the opening between the plates 3. Alternatively separate means may be provided for regulating the length of the opening between the plates 3.

One form of such means is illustrated in Figure 10 where the trough 1 is fitted at each end 6 with a flat slide 19 which works through and fits an opening in the end. These slides rest upon the upper face of the plates 3, the length of the space between the latter being regulated by adjusting the slides so that their inner ends 20 project inwards over said space to a greater or lesser extent as required. The slides 19 are adjusted by hand and may be graduated or marked on the upper face to facilitate adjustment and setting to positions for giving definite lengths of opening. The slides 19 may be employed in conjunction with either of the before mentioned means 15 or 17 in which case said means would be made to extend down to the top of the slides 19 and instead of to the plates 3. When the slides 19 are provided, the screw 11 for adjusting the plates 3 may be arranged on the underside of said plates instead of on the top.

The material 2 in continuous strip form is carried on a suitable drum 21 (Figure 1) supported over the trough by a frame 22 and passes therefrom over a guide 23 and thence down through the trough 1 as already described. After passing between the scrapers 3, the carrier material 2, which it will be understood is now in a coated or impregnated condition, hereinafter termed loaded, is combined with the one or more covering materials on either side. These are brought into association with the loaded carrier material 2 conveniently by means of a pair of rollers 24 (Figure 3) between which all the materials are caused to pass, the loaded material 2 passing in between the others and the said rollers 24 being adjusted so that they operate with sufficient pressure to properly combine the layers without squeezing the agent out at the sides. The covering materials, which in the example shown comprise four 25, 26, 27 and 28, are supplied from drums 29, 30, 31 and 32 respectively (Figure 1) appropriately situated in the frame 22 for the strip materials to be drawn off and passed between the pressing rollers 24 in company with the loaded material 2.

Figure 11:
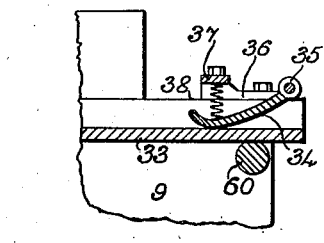
Figure 11 shows, in section, a presser device for operating upon the strip material as it passes into the machine.

The continuous strips of material, which are drawn in at the sides of the machine, pass over feed tables 33 (Figures 1, 2 and 3) fixed between the side frames 9. There may be combined with these tables presser devices such for example as the device 34, shown in Figure 11, which consists of a curved plate pivoted upon a transverse rod 35 supported at opposite sides of the table by fitments 36 which also carry a cross bar 37 between which and the plate 34 compression springs 38 are arranged to press the plate upon the strips of material as they pass thereunder. This device tends to eliminate creases and tensions the strips so that they pass properly to the pressing rollers 24. Other means may however, be adopted for the same purpose.

In the arrangement shown in Figures 1 and 3, the pressing rollers 24, combine the various strips of material 2, 25, 26 27 and 28 by bringing and presing them together face to face. In the present case these rollers are rotated by the strips of material and are not positively driven and do not serve to feed the strips. The said rollers may, alternatively be mechanically driven by suitable gears and they may be formed to draw i. e. feed the strips of material as well as combine them. In the case where the rollers 24 serve merely to bring the various layers into proper association and press them together, a separate pair of drawing rollers is provided.

The pressing or pinch rollers may be adjusted relatively to each other by suitable devices such as the set screws 39 (Figure 1) to give the pressure required.

According to the arrangement shown in Figures 1 and 3, the continuous strip 40 of the combined materials 2, 25, 26, 27 and 28 i. e. what may now be termed the stiffening material, after leaving the presser rollers 24 is passed through a cutting device which automatically cuts out shaped stiffeners as indicated at 41 in Figure 3. The cutting device comprises a pair of rollers 42, 43, the roller 42 having knives 44 on its peripheral surface which cut the material 40 as it passes over the bed roll 43. Previous to passing between the rollers 42, 43, the material 40 passes over a guide roller 45 which causes it to lay properly on the bed roll 43 preparatory to meeting the knives 44.

In the machine shown the rollers 42, 43 of the cutting device are positively driven and serve to draw the whole of the materials through the machine. For this purpose the roller 43 is driven by a gear wheel 46 (Figures 1 and 2) actuated by a pinion 47 and belt driven pulley 48, the roller 42 being driven from the roller 43 by gear pinions (not shown) at the opposite side of the machine. The rollers 42, 43 are relatively adjusted by set screws 49 (Figure 1) or other suitable means.

In a machine arranged for producing stiffeners comprising a loaded carrier layer of swansdown, hessian or similar material combined with a layer of muslin on either side and an outer layer of dressed fabric covering each muslin layer, a strip 2 of the carrier material (Figures 1 and 3) passes down through the trough 1 as aforesaid, strips 25, 26 of muslin are fed at opposite sides to come next to the carrier strip 2, and strips 27, 28 of dressed fabric are fed at opposite sides to come next to the muslin, all five strips passing together between the pressing rollers 24 where they are brought into close association.

The number of strips of material employed to form the stiffeners may be varied. For example, as indicated by the full and dotted lines in Figure 1, two strips may be run through the trough these passing through the same opening in the bottom. Or more than two strips may be run through the trough, the additional strip or strips being served from a suitably placed drum or drums.

In cases where one or more layers of other material are to be interposed between plural (say two) carrier layers, the trough may be formed with separate compartments, or two troughs may be used, so that the carrier layers are kept separated until it is desired to associate them with the other layers. The separate compartments or troughs each supply a strip of loaded material.

Figure 12:
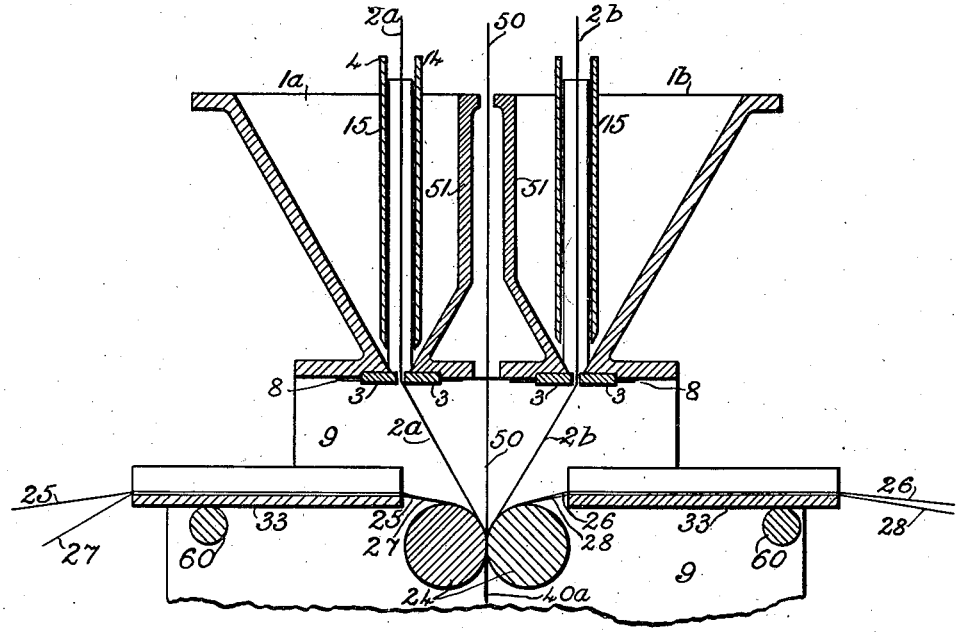
Figure 12 shows in vertical section a double or divided trough arrangement.

An arrangement of the kind just referred to is illustrated in Figure 12. The apparatus here shown forms stiffening material 40$^a$, composed of seven associated layers comprising two loaded strips or carries 2$^a$, 2$^b$ an intermediate non-loaded strip 50 and outer layers 25, 26, 27 and 28. The strips 2$^a$ 2$^b$ pass through separate troughs 1$^a$, 1$^b$, each of similar construction to that already described, and the intermediate strip 50 passes down between the troughs, all the strips being associated and pressed together as they pass between the roller 24. In this arrangement, instead of the troughs 1$^a$, 1$^b$, being separate they may consist of compartments formed in a single trough by the members 51 which in this case would act as partitions and form between them the central passage for the intermediate strip 50. The various strips of material referred to in Figure 12 are supplied from drums suitably disposed to allow the strips to pass in, in proper association.

Figure 13:
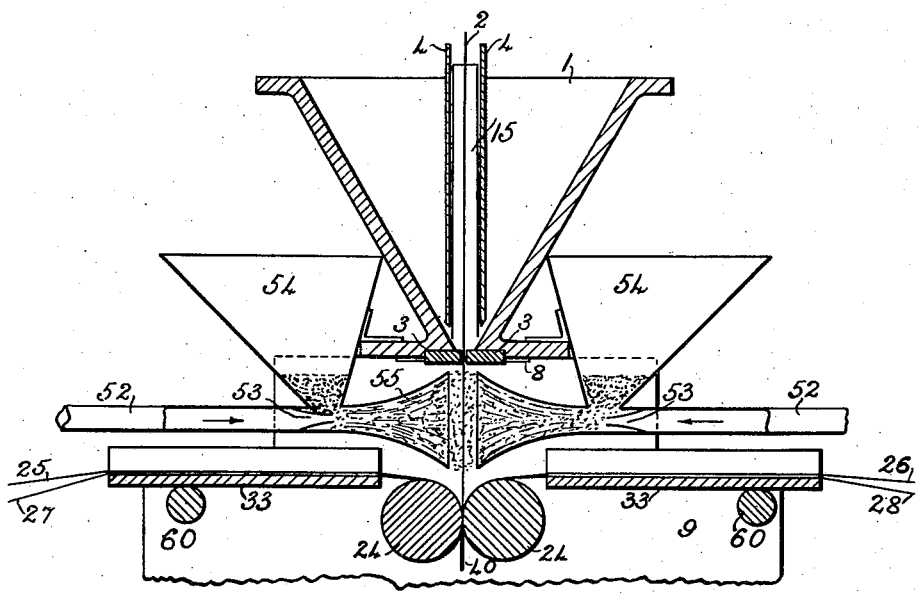
Figure 13 shows in vertical section an arrangement of means for blowing shoddy, cork dust or other material on the loaded carrier strip.

It will be understood that the different strips of material from their various sources meet at the pressing rollers. In some cases it may be desirable to introduce a blast of shoddy, cork dust, leather dust, or such like small fibrous, granulated or powdered material to form a coating on one or both sides of the loaded carrier strip prior to the latter meeting and assembling with one or more subsidiary strips. Or the coating or coatings thus applied by blast to the loaded strip may serve instead of one or more of the subsidiary strips in which case the latter would be omitted. A convenient arrangement for introducing a blast of the character above referred to is illustrated in Figure 13. In this arrangement an air pipe 52 has a nozzle 53 situated in close proximity to the open end of a hopper 54 containing the shoddy or other material in bulk. The jet of air issuing from the nozzle draws material from the hopper and carries it forward through a bell-mouth 55 by which it is directed upon the face of the loaded strip 2 as the latter passes from the trough 1 to the presser rollers 24. A blast apparatus of the kind described is situated on each side of the machine as shown, and by suitably controlling the air supply, either or both sides of the loaded strip 2 may be coated with the fibrous, granulated or powdered material.

It may be mentioned here that the stiffening material 40ª produced by the apparatus shown in Figure 12 and the stiffening material 40 produced by the apparatus shown in Figure 13 substantially passes through a cutting device such as shown in Figure 3 and is cut up to form the articles required.

When a plurality of loaded strips are used, it may sometimes be desirable to coat these on one side only. This is effected as already described by closing down the shutter 4 on the side to be left uncoated.

Figure 6:
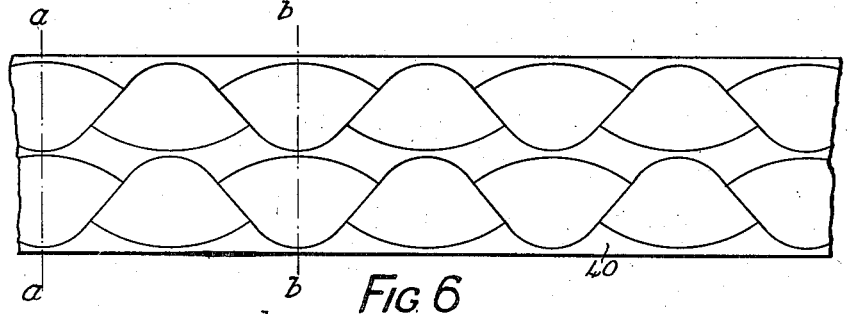
Figures 6 and 7 show in plan the manner in which the stiffeners are cut out from the continuous length of material.
Figure 7:
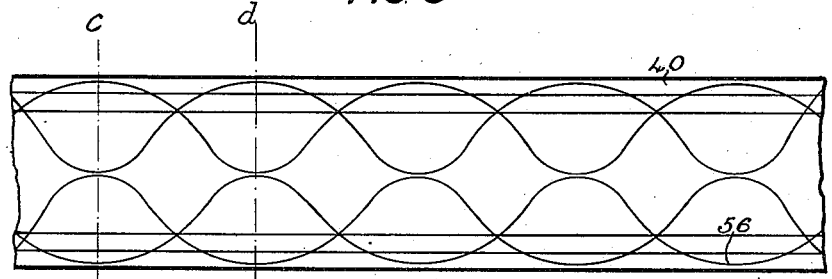

With regard to the cutting device 42, 43 it will be understood that the knives on the roller 42 are properly shaped to cut out the stiffeners as the material 40, or 40ª as the case may be, passes between the rollers. Figure 6 represents, in plan, a length of the stiffening material the outlines in the strip indicating how toe stiffeners may be economically cut therefrom. In this case the outlines between the transverse lines *a—a* and *b—b* would represent a projection of the configuration of the knives formed upon the peripheral surface of the knife roller 42. Figure 7 is a similar view showing a strip of stiffening material composed of layers of varying width so that it is thinner at its edges. The outlines indicate the manner in which toe stiffeners are cut from the strip when it is desired that they shall be thinned along their edge 56. In this case the outlines between the transverse lines *c—c* and *d—d* represent a projection of the configuration of the knives.

Figure 8:
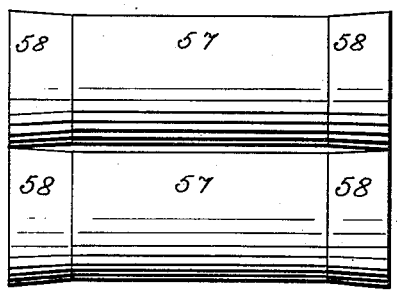
Figure 8 shows a pair of rollers for thinning stiffening material at the edges.
Figure 9:
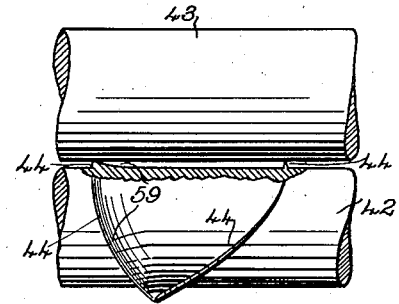
Figure 9 shows the cutting rollers with the knife formed to thin or bevel the stiffeners along one edge as they are cut out.

Some of the rollers hereinbefore referred to between which the associated and combined strips pass, or rollers provided for the purpose, may have surfaces adapted to nip the strip of stiffening material tighter at its marginal edges and other parts with a view to more tightly and closely combining the layers at such localities and forming a thin edge or part. A pair of rollers of this character is shown in Figure 8 where each roller 57 is formed with a conical end 58. A strip of the combined materials passed between these rollers 57 and approximately equal in width to the length of the rollers, will be compressed to a greater extent at its edges than in any other part. These rollers are suitable for use in making a continuous length of stiffening material from which stiffeners are to be cut as indicated in Figure 7 and they are particularly effective when graded strips of material i. e. strips of different widths, are used in combination. The knives 44 may be so formed as to produce, at the time of cutting, a thin edge at any desired part of the article. This is effected by a shaped filling 59 (Figure 9) on the inside of the cutting edge at the part to be thinned. For instance, the filling 59 shaped as shown in the sectional portion of Figure 9 applied along the inside of the part of the knife which cuts the edge 56 of the stiffener, will compress said edge against the opposing bed roller 43 and thus thin it down. By the means above described the effect of a skived edge may be produced as the stiffeners or articles are cut out.

The side frames 9 of the machine are fastened together by bolts 60 which are shouldered down at each end so that the centre part forms a distance piece between the frames.

The side frames are fastened to a bench or table 61 which carries the before mentioned frame 22 and has an opening 62 (Figure 3) formed therein through which the articles, as they are cut out, fall into any convenient receptacle situated underneath. The various additional rollers when required may be driven by gears or chains and sprockets.

Claims—

1. A machine for making stiffener articles or stiffening material of the kind herein referred to, comprising a trough to contain stiffening agent in bulk and in solution or moist condition, two shutters adjustable vertically in the trough to vary the space between their lower edges and the bottom of the trough for the purpose of regulating the flow of the stiffening agent to the strip material which passes between the shutters, and means to bring one or more strips of unloaded material into association with the loaded strip material.

2. A machine for making stiffener articles or stiffener material of the kind herein referred to, comprising a trough to contain the stiffening agent in bulk and in solution or moist condition, means to enable strip material to pass through said trough and become loaded with the stiffening agent, means to regulate the flow of the stiffening agent to the strip material, adjustable means at the bottom of the trough to regulate the opening through which the strip passes, and means to associate and combine one or more strips of unloaded material with the loaded strip material.

3. A machine for making stiffener articles or stiffening material of the kind herein referred to, comprising a trough to contain the stiffening agent in bulk and in solution or moist condition, means to enable strip material to pass through said trough and become loaded with the stiffening agent, means to regulate the flow of the stiffening agent to the strip material, adjustable scrapers to regulate the opening through which the loaded strip passes and remove superfluous stiffening agent from the latter, said scrapers consisting of a pair of plates having parallel inside edges and converging outer edges the plates being situated in a recess having converging sides to suit the outer edges of the plates, springs arranged to hold the plates in contact with the sides of the recess, a screw to move the plates endwise in the recess whereby the intervening space is varied in width, and means to bring one or more strips of unloaded material into association with the loaded strip material.

4. A machine for making stiffener articles of the kind herein referred to, comprising a trough to contain the stiffening agent in bulk and in moist condition, means to enable strip material to pass through said trough and become loaded with the stiffening agent, means to regulate the flow of the stiffening agent to the strip material, adjustable scrapers to regulate the width of the opening through which the loaded material passes, means to vary the length of said opening, and means to bring strips of unloaded material into association with the loaded material.

5. A machine for making stiffener articles of the kind herein referred to, comprising a trough to contain the stiffening agent in bulk and in moist condition, means to enable strip material to pass through said through and become loaded with the stiffening agent, means to regulate the flow of the stiffening agent to the strip material, adjustable scrapers to regulate the width of the opening through which the loaded material passes, removable bars to vary the length of said opening, and means to bring strips of unloaded material into association with the loaded material.

6. A machine for making stiffener articles of the kind herein referred to, comprising a trough to contain the stiffening agent in bulk and in moist condition, means to enable strip material to pass through said trough and become loaded with the stiffening agent, means to regulate the flow of the stiffening agent to the strip material, adjustable scrapers to regulate the width of the opening through which the loaded material passes, adjustable slides to vary the length of said opening, and means to bring strips of unloaded material into association with the loaded material.

7. A machine for making stiffener articles of the kind herein referred to, comprising a trough to contain the stiffening agent in bulk and in moist condition, means to enable strip material to pass through said trough and become loaded with the stiffening agent, means to supply strips of unloaded material, a pair of rollers between which the strip materials pass and by which the loaded and unloaded strips are brought into close association, and a cutting device consisting of a pair of rollers between which the associated strips pass one of said rollers having shaped knives on its peripheral surface and the other roller serving as a bed roll to support the material in opposition to the cutting roller.

8. A machine for making stiffener articles of the kind herein referred to, comprising a trough to contain the stiffening agent in bulk and in moist condition, means to enable strip material to pass through said trough and become loaded with the stiffening agent, means to supply strips of unloaded material a pair of rollers between which the strip materials pass and by which the loaded and unloaded strips are brought into close association, and a cutting device consisting of a pair of rollers between which the associated strips pass one of said rollers having shaped knives on its peripheral surface and the other roller serving as a bed roll to support the material in opposition to the cutting roller, the knives on the cutting roller having a filling combined therewith adapted to produce a thinned edge on the articles as they are cut out, substantially as and for the purpose described.

9. A machine for making stiffener articles of the kind herein referred to, comprising a trough to contain the stiffening agent in bulk and in moist condition, means to enable strip material to pass through said trough and become loaded with the stiffening agent, means to supply strips of unloaded material, a pair of rollers between which the strip materials pass and by which the loaded and unloaded strips are brought into association and combined, and rollers between which the associated and combined strips pass, said rollers having shaped surfaces adapted to nip the strip and form a thin part therein, substantially as described.

10. A machine for making stiffener articles of the kind herein referred to, comprising a trough to contain the stiffening agent in bulk and in moist condition, means to enable strip material to pass through the trough and become loaded with the stiffening agent, means to supply unloaded strip material, a pair of rollers between which the strip materials pass and by which the loaded and unloaded strips are associated and combined, and means to coat the loaded strip with fibrous, granulated or powdered material prior to said strip meeting and assembling with the unloaded strip material, substantially as described.

11. A machine for making stiffener articles of the kind herein referred to, comprising a trough to contain the stiffening agent in bulk and in moist condition, means to enable strip material to pass through the trough and become loaded with the stiffening agent, means to supply strips of unloaded strip material, a pair of rollers between which the strip materials pass and by which the loaded and unloaded strips are associated and combined, and blast apparatus for supplying fibrous, granulated or powdered material to form a coating on the loaded strip prior to the latter meeting and assembling with the unloaded strip material, substantially as described.

12. A machine for making stiffener articles of the kind herein referred to, comprising a trough to contain the stiffening agent in bulk and in moist condition, means to enable strip material to pass through the trough and become loaded with the stiffening agent, means for supplying strips of unloaded material, feed tables over which said unloaded strips pass, a pair of rollers between which the strips from the trough and feed tables pass and by which said strips are associated and combined, and spring pressed pivoted plates for tensioning the strips as they pass over the feed tables.

13. A machine for making stiffener articles of the kind herein referred to, comprising a trough to contain the stiffening agent in bulk and in moist condition, two compartments in said trough, means to enable strip material to pass through each compartment and become loaded with the stiffening agent, a passage between said compartments to enable unloaded strip material to pass between the loaded material, means to supply further strips of unloaded material, and means to associate and combine the loaded and unloaded strips, and means to automatically cut the associated and combined strips to produce the articles required.

14. A machine for making stiffener articles of the kind herein referred to, comprising a trough to contain the stiffening agent in bulk and in moist condition, two compartments in said trough, a pair of adjustable shutters in each compartment to regulate the flow of the stiffening agent to strip material passed through the compartment between the shutters, a passage formed between said compartments, means to enable strip material to pass through said passage so that it is received in an uncoated condition between the strips which have passed through the compartments and thereby become loaded with the stiffening agent, means to supply further strips of unloaded material, and means to associate and combine the loaded and unloaded strips.

15. A machine for making stiffener articles of the kind herein referred to, comprising a trough to contain the stiffening agent in bulk and in moist condition, two compartments in said trough, a pair of adjustable shutters in each compartment to regulate the flow of the stiffening agent to strip, material passed through the compartment between the shutters, a pair of adjustable scrapers to remove superfluous stiffening agent from the strip material as it passes from the trough, a passage formed between the two compartments of the trough to enable unloaded strip material to pass in between the loaded strip material, means to supply unloaded material for application to the outside of the loaded material, and a pair of rollers between which all the strips of material pass and by which they are associated and combined.

In testimony whereof I affix my signature in presence of two witnesses.

DAVID BAIRD MACDONALD.

Witnesses:
B. W. C. TAYLOR,
GEORGE LESTER.